April 17, 1956 — W. E. HAMEL ET AL — 2,741,888
COTTON PICKER

Filed June 3, 1952 — 2 Sheets-Sheet 1

INVENTORS
WILLIAM E. HAMEL
LLOYD C. STEARMAN
BY Taylor and Lassagne
ATTORNEYS

April 17, 1956
W. E. HAMEL ET AL
2,741,888
COTTON PICKER
Filed June 3, 1952
2 Sheets-Sheet 2
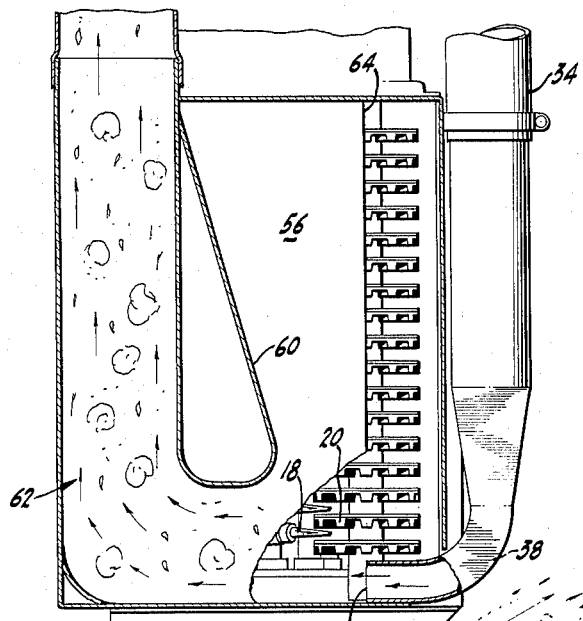
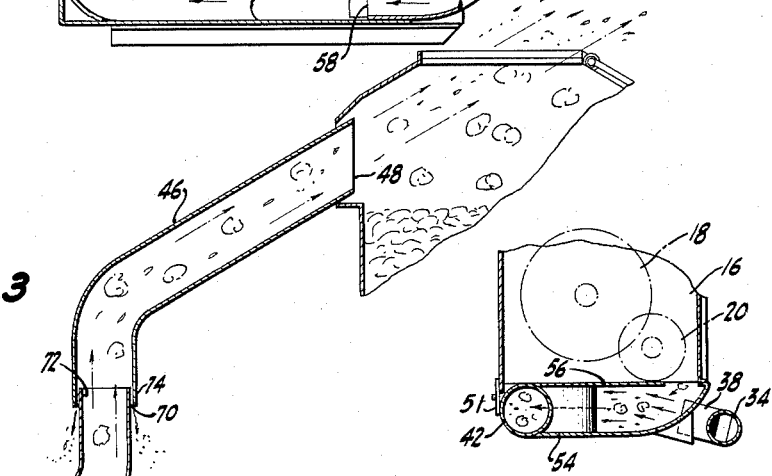
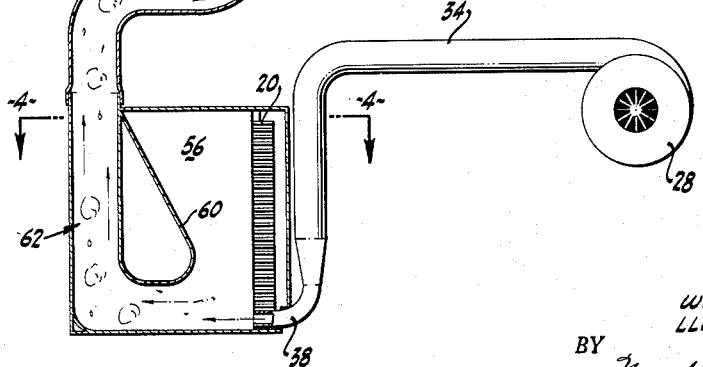
INVENTORS
WILLIAM E. HAMEL
LLOYD C. STEARMAN
BY
Naylor and Lassegne
ATTORNEYS

2,741,888
Patented Apr. 17, 1956

United States Patent Office

2,741,888
COTTON PICKER

William E. Hamel and Lloyd C. Stearman, Dos Palos, Calif., assignors to Stearman-Hamel, Inc., Dos Palos, Calif., a corporation of California Application June 3, 1952, Serial No. 291,424

6 Claims. (Cl. 56—12)

This invention relates to mechanical cotton pickers and more particularly to improvements in cotton pickers whereby the possibilities of plugging, staining or ravelling the picked cotton are reduced to a minimum, i. e., to such an extent that the quality of the cotton picked with the improved picker of the invention is approximately equal to that of hand-picked cotton.

An object of the invention is to provide a mechanical cotton picker embodying an improved cotton conveyor system in connecting relation between the picking chamber of the picker and the storage basket thereof, whereby the picked cotton may be conveyed to the basket without being stained or ravelled or otherwise physically degraded during transit.

A further object of the invention is to provide in the improved cotton conveyor system of the invention means for eliminating from the conveyor system the heavier debris that normally accompanies the cotton.

These and further objects and advantages of the invention will be apparent from the following description taken in conjunction with the drawings forming part of this specification, and in which:

Figure 2 is a detail view on an enlarged scale of the picking chamber portion of the conveyor system of the invention, with parts thereof being broken away for purposes of clarity;

Figure 3 is a view in side elevation of the conveyor system of the invention, with portions thereof being shown in section; and Figure 4 is a detail view in section taken along lines 4—4 of Figure 3.

Figure 1:
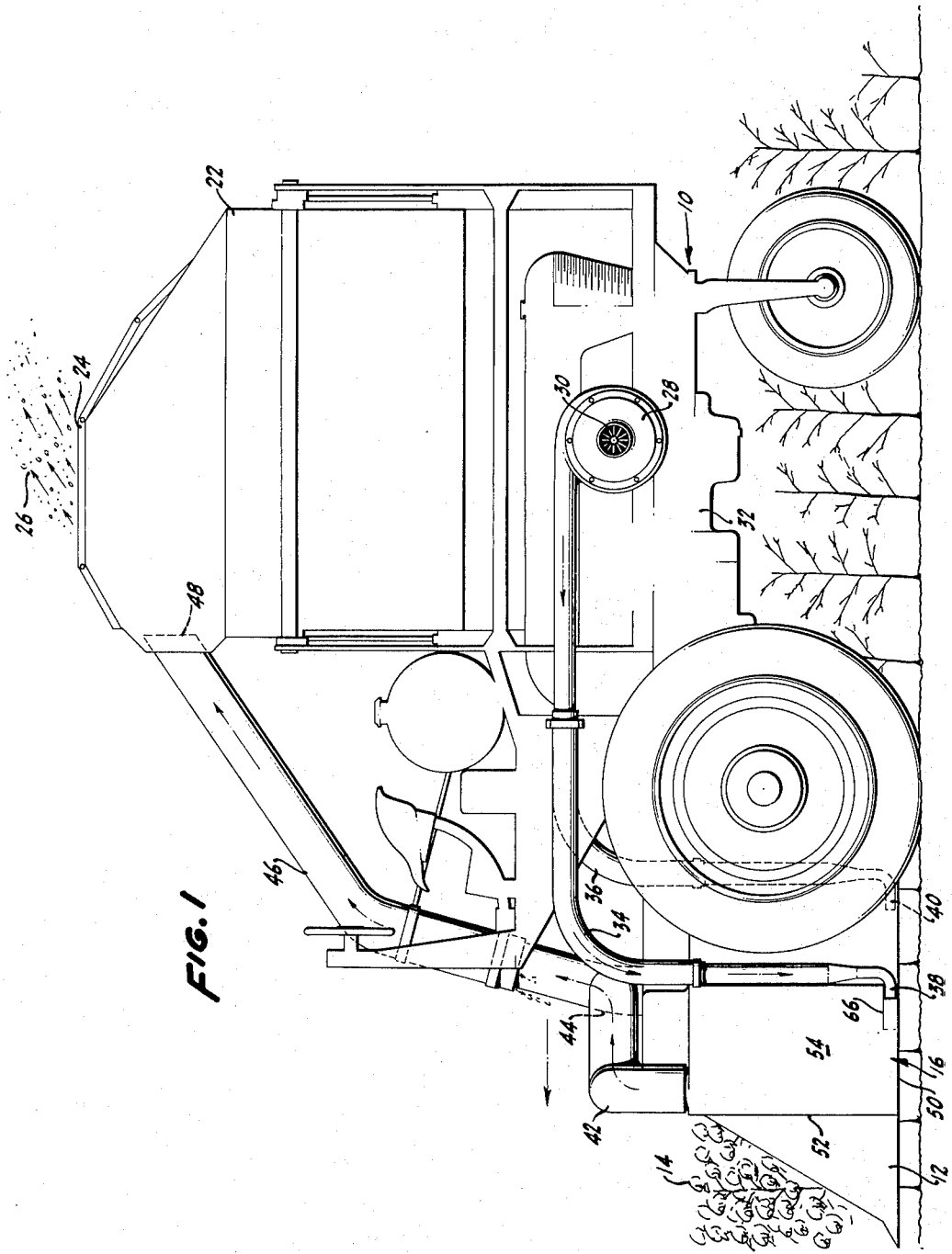
Figure 1 is a view in side elevation of a mechanical cotton picker embodying the invention.

Referring to the drawings, Figure 1 shows a cotton picker of a known and commercially available type. The elements of the cotton picker system are mounted on a tractor 10, and these elements, in the sequence in which they are employed in the over-all picking procedure, consist of: a pair of parallel spaced plant lifters 12 adapted to receive therebetween and properly position the cotton plants 14 as the tractor is driven over rows of these plants; spaced picking chambers 16 containing rotatable barbed spindles 18 adapted to pick the cotton from the plants on each side of the row, and rubber doffers 20 adapted to remove the cotton from the spindles 18 for gravity movement to the bottom of the picking chamber (see Figure 2); an air conveyor system adapted to convey the picked cotton from the bottom of the picking chambers to a cotton storage basket 22; and cleaning grates 24 located in the roof of the basket 22 and adapted to pass therethrough, as indicated at 26, the dirt and trash which is conveyed to the basket by the air conveyor system. The picker elements thus far described and identified by reference numerals in Figure 1 are well known in the art, and their specific details are not essential to the practice to the subject invention. The subject invention relates essentially to the provision of a novel form of air conveyor system for a cotton picker of the type described, and this air conveyor system will now be described in such detail to enable those skilled in the art to which the invention appertains to fully understand and be able to practice the same.

The air conveyor system of the invention is comprised of a pair of high pressure centrifugal blowers, the turbine elements of which are mounted on a common cross shaft 30 at either side of the tractor engine 32, said elements being drivably connected by any conventional means, not shown, to the motor 32, blower conduits 34 and 36 leading from the blowers 28 and terminating in outlet nozzles 38 and 40 which are in communication with the picking chambers 16, outlet conduits 42 and 44 leading from the picking chambers 16 and merging together in a common conduit 46 having an outlet 48 in communication with the basket 22.

That portion of the air conveyor system located between the outlet of nozzle 38 and the inlet of conduit 42, the corresponding portion of the air conveyor system between nozzle 40 and conduit 44 being similar in detail, is shown in Figures 2–4. The chamber 16 is provided with an outwardly disposed access door 50 having a vertically disposed and forwardly located hinge connection 51. The access door 50 is provided with an outer wall 54, which extends for the full length of the chamber 16, and an inner wall 56 which terminates just forwardly of the mouth 58 of the nozzle 38. A scroll type baffle 60 transversely disposed between the outer and inner walls 54 and 56 of the access door defines with these walls a picking chamber conduit indicated generally at 62 which forms the intermediate air conveyor link between nozzle 38 and the exterior conduit 42.

In operation, the doffers 20 remove the cotton from the picking spindles 18 and throw the picked cotton outwardly past the rearward edge 64 of the inner wall of the access door, and the cotton then gravitates downwardly toward the mouth 58 of nozzle 38, the latter fitting within a complementary foot housing 66 formed in the outer wall of the access door. High velocity air driven through conduit 34 and nozzle 38 entrains the downwardly descending cotton, and the cotton is then moved by the air stream to the internal conduit 62 and the external conduits 42 and 46, to be discharged from outlet 48 of the latter conduit into basket 22.

The conveyor system of the invention embodies means enabling the elimination of debris from the conduit 46 before the material being conveyed therein reaches the basket, said means comprising an annular free space 70 defined between the upper end 72 of conduit 42 and the overlapping lower end 74 of conduit 46. The lifting effect of the moving air stream within the conduit system on the heavier, or debris, material, such as dirt, stalks, twigs, and the like, is such as to be effectively countered or opposed by gravitational forces when this material reaches the lower end of conduit 46. A substantial portion of this heavier material thus moves to the outer boundaries of the moving air stream and drops through the annular free space 70. The cotton reaching the basket 22 is thus substantially free of this unwanted debris material.

The cotton reaching the basket therefore is not only substantially free of debris, but is also free of broken seeds, and is also characterized by an absence of greening or staining and an absence of twisted or roped portions. These desirable characteristics are essentially due to the fact that the conveyor system of the invention embodies a pressure blower arrangement, i. e., where the blower is located in pushing relation to the cotton picking chamber, rather than a suction blower system, i. e., where the blower is located in the conveyor system between the picking chamber and the basket. Thus, in the present system the cotton does not pass through the blower where it would be greened and twisted, and the configuration of the air conduit system between the picking chamber and the basket may therefore be made as short and direct as possible, there being no need to adapt the form of the air conduit to convenient placement of the blower in relation to the tractor motor. The subject conveyor system therefore eliminates the need for embodying double reverse bends in the conduit 46 in order to lead the conduit through the blower to the basket, as is the case with the present day conventional cotton picker systems. By placing the blower outside of the path of travel of the cotton, thereby enabling the conduit for the cotton to be free of cotton-damaging convolutions, the capacity of a cotton picker embodying the present invention is greatly increased over that of conventional systems of the type mentioned, because there is no need in the present system to limit the velocity of the air stream in an attempt to avoid greening and twisting of the cotton.

Having thus described the preferred embodiment of the invention and its mode of operation, what we claim as new and desire to secure by Letters Patent is:

1. In a motor-driven mobile cotton picker having a picking chamber provided with a bottom closure, a cotton-receiving basket, and a conveyor system connecting said chamber with said basket comprising a conduit and a blower associated therewith and actuated by the motor of said picker; the improvement residing in conduit means disposing said blower in air-delivery relation to said chamber, said means including a blower outlet nozzle having a vertically narrow mouth extending horizontally into said chamber in immediately adjacent relation to the bottom closure of said chamber.

2. In a motor-driven mobile cotton picker having a picking chamber, a cotton-receiving basket, and a conveyor system connecting said chamber with said basket comprising a conduit and a blower associated therewith and actuated by the motor of said picker; the improvement residing in the combination of conduit means disposing said blower in air-delivery relation to said chamber, and partition means positioned within said chamber operable to constrain the air delivered to said chamber from said blower to bypass the main, or picking element-containing, portion of said chamber, while allowing the cotton picked within said chamber to be entrained within said air, said partition means being operable to direct the air to the conduit connected to said basket.

3. In a motor-driven mobile cotton picker having a picking chamber, a cotton-receiving basket, and a conveyor system connecting said chamber with said basket comprising a conduit and a blower associated therewith and actuated by the motor of said picker; the improvement residing in the combination of conduit means disposing said blower in air-delivery relation to said chamber, and means, comprising a pair of telescoped pipe sections of unequal diameter constituting the conduit connecting said chamber and basket, defining a downwardly opening annular space adapted for the gravitational elimination from said conduit of relatively heavy debris material which is difficultly movable through said conduit to said basket under the action of said blower.

4. In a cotton picker having a picking chamber, a cotton-receiving basket, a conduit connecting said chamber with said basket, and an air blower to transmit cotton from said chamber through said conduit to said basket; the combination of conduit means disposing said blower in air-delivery relation to said chamber, wall means positioned within said chamber operable to constrain air delivered to said chamber from said blower to bypass the main, or picking element-containing, portion of said chamber, while allowing the cotton picked within said chamber to be entrained within said air; said wall means being operable to direct the air to the conduit connected to said basket; and means, comprising a pair of telescoped pipe sections of unequal diameter constituting the conduit connecting said chamber and basket, defining a downwardly opening annular space adapted for the gravitational elimination from said conduit of relatively heavy debris material which is difficultly movable through said conduit to said basket under the action of said blower.

5. In a cotton picker having a picking chamber provided with a bottom closure, a cotton-receiving basket relatively remotely disposed with respect to said chamber, and a conveyor system being adapted to transfer picked cotton from said chamber to said basket, said conveyor system comprising a blower, a first conduit interconnecting said blower with said chamber, said conduit terminating within said chamber in a substantially horizontally disposed outlet nozzle located immediately adjacent the bottom closure of said chamber, an inner wall member vertically disposed within said chamber and dividing said chamber into a main, or picking element-containing, portion and a portion of lesser size adapted to transmit therethrough air received from said first conduit, said wall being adapted to allow cotton picked within said main chamber portion to enter said chamber portion of lesser size adjacent the end of said nozzle to become entrained in the air stream therein, and a second conduit interconnecting said chamber portion of lesser size with said basket.

6. In a cotton picker as set forth in claim 5, said second conduit comprising a pair of telescoped pipe sections of unequal diameter defining therebetween a downwardly opening annular space for the gravitational elimination from said conduit of relatively heavy debris material which is difficultly movable through said conduit under the action of said blower.

References Cited in the file of this patent

UNITED STATES PATENTS

| | | |
|---|---|---|
| 359,724 | Hanks | Mar. 26, 1887 |
| 685,112 | Dannelly | Oct. 22, 1901 |
| 755,059 | Shaw | Mar. 22, 1904 |
| 767,058 | Harvin | Aug. 9, 1904 |
| 1,225,193 | Vittetoe | May 8, 1917 |
| 1,355,787 | Skillens | Oct. 12, 1920 |
| 2,401,152 | Hagen | May 28, 1946 |
| 2,462,800 | Berry | Feb. 22, 1949 |